US011195065B2

(12) United States Patent
Aliamiri et al.

(10) Patent No.: US 11,195,065 B2
(45) Date of Patent: Dec. 7, 2021

(54) SYSTEM AND METHOD FOR JOINT IMAGE AND LIDAR ANNOTATION AND CALIBRATION

(71) Applicant: Samsung Electronics Co., Ltd., Suwon-si (KR)

(72) Inventors: Alireza Aliamiri, San Jose, CA (US); Daniel Meir Amar, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 27 days.

(21) Appl. No.: 16/780,042

(22) Filed: Feb. 3, 2020

(65) Prior Publication Data

US 2021/0158079 A1 May 27, 2021

Related U.S. Application Data

(60) Provisional application No. 62/939,544, filed on Nov. 22, 2019.

(51) Int. Cl.
*G06K 9/00* (2006.01)
*G06K 9/62* (2006.01)
(Continued)

(52) U.S. Cl.
CPC .............. *G06K 9/629* (2013.01); *G01S 7/497* (2013.01); *G01S 17/86* (2020.01);
(Continued)

(58) Field of Classification Search
CPC .. G06K 9/629; G06K 9/00791; G06K 9/4671; G06T 7/80; G06T 2207/10028;
(Continued)

(56) References Cited

U.S. PATENT DOCUMENTS 8,553,942 B2 10/2013 Lynch
9,739,881 B1 8/2017 Pavek et al.
(Continued)

FOREIGN PATENT DOCUMENTS

EP 2517189 B1 3/2014

OTHER PUBLICATIONS

Dai, Jifeng et al.; R-FCN: Object Detection via Region-based Fully Conventional Networks, Article, arXiv.org., Cornell University, Jun. 21, 2016, 11 pages.
(Continued)

*Primary Examiner* — Ping Y Hsieh
*Assistant Examiner* — Xiao Liu
(74) *Attorney, Agent, or Firm* — Lewis Roca Rothgerber Christie LLP

(57) ABSTRACT

A calibration system includes a processing circuit configured to receive data corresponding to a first image where the data includes information corresponding to a 2D BEV of a scene, and to receive data corresponding to a second image where the data includes information corresponding to a 2D image of the scene. The processing circuit may determine a salient feature in the first image or the second image, and project, based on a first calibration setting, the salient feature from the first image to the second image or vice versa. The processing circuit may select a region corresponding to the projected salient feature in the first image or the second image, determine an identity of the salient feature, and determine a second calibration setting based on the identity of the salient feature and the selected region corresponding to the salient feature in the 2D BEV and the 2D image.

18 Claims, 11 Drawing Sheets
(3 of 11 Drawing Sheet(s) Filed in Color)

(51) Int. Cl.
*G06K 9/46* (2006.01)
*G06T 7/80* (2017.01)
*G01S 7/497* (2006.01)
*G01S 17/86* (2020.01)

(52) U.S. Cl.
CPC ....... *G06K 9/00791* (2013.01); *G06K 9/4671* (2013.01); *G06T 7/80* (2017.01); *G01S 7/4972* (2013.01); *G06T 2207/10028* (2013.01); *G06T 2207/30252* (2013.01)

(58) Field of Classification Search
CPC .......... G06T 2207/30252; G01S 17/86; G01S 7/497; G01S 7/4972
See application file for complete search history.

(56) References Cited

U.S. PATENT DOCUMENTS

| | | |
|---|---|---|
| 2014/0247352 A1 | 9/2014 | Rathi et al. |
| 2014/0247354 A1 | 9/2014 | Knudsen |
| 2015/0138310 A1 | 5/2015 | Fan et al. |
| 2017/0206430 A1* | 7/2017 | Abad ........................ G06T 5/00 |
| 2019/0025853 A1 | 1/2019 | Julian et al. |
| 2019/0156504 A1* | 5/2019 | Jiang ........................ G06T 7/596 |
| 2020/0064483 A1* | 2/2020 | Li ........................... G01S 17/87 |
| 2020/0082560 A1* | 3/2020 | Nezhadarya ............ G06T 15/20 |

OTHER PUBLICATIONS

Girshick, Ross; Fast R-CNN, Article arXiv.org., Cornell University, Sep. 27, 2015, 9 pages.
Girshick, Ross et al.; Rich feature hierarchies for accurate object detection and semantic segmentation, Tech report (v5), Article, arXiv.org., Cornell University, Oct. 22, 2014, 21 pages.
He, Kaiming et al.; Mask R-CNN, Facebook AI Research (FAIR), arXiv.org., Cornell University, Jan. 24, 2018, 12 pages.
Liu, Wei et al.; SSD: Single Shot MultiBox Detector, Article, arXiv.org., Cornell University, Dec. 29, 2016, 17 pages.
Zhang, Zhengyou; A Flexible New Technique for Camera Calibration, Technical Report MSR-TR-98-71, Microsoft Research, Microsoft Corporation, Dec. 2, 1998, 22 pages.
Szeliski, Richard, "Computer Vision: Algorithms and Applications, $2^{nd}$ ed., Section 2.1.4 entitled 3D to 2D projections," ©2021 Springer, 37 pages.
"Camera Matrix", From Wikipedia, last edited on Mar. 9, 2021, 1 page.
Hartley, R and Zisserman, A, "Multiple View Geometry in Computer Vision", Second Edition, Section 6.1 entitled" Finite cameras," United Kingdom: Cambridge University Press, 27 pages.

* cited by examiner

SYSTEM AND METHOD FOR JOINT IMAGE AND LIDAR ANNOTATION AND CALIBRATION

CROSS-REFERENCE TO RELATED APPLICATION(S)

The present application claims priority to and the benefit of U.S. Provisional Application No. 62/939,544, filed Nov. 22, 2019, entitled "SYSTEM AND METHOD FOR OFFLINE EFFICIENT AND AUTOMATED JOINT IMAGE AND LIDAR ANNOTATION AND CALIBRATION", the entire content of which is incorporated herein by reference.

FIELD

One or more aspects of embodiments according to the present disclosure relate to a system and method for annotation and calibration of lidar data and camera images.

BACKGROUND

In recent years, advanced driver assistance systems ("ADAS") have become more widely available. Further, advancements in robotics have led to an increasing demand for technology enabling vehicles to move autonomously. While a range of technological solutions have been proposed for implementing ADAS and/or enabling autonomous movement, advancements in light detection and ranging ("lidar") systems and camera imaging systems have the potential, in addition to assisting drivers to drive safely, to allow vehicles to travel smoothly and avoid collisions by detecting obstructions. Automating such movement improves safety and expands on the range of practical applications for vehicles because autonomous systems are less prone to accidents caused by human negligence and/or recklessness.

However, systems that rely solely on lidar systems or camera systems may not supply enough information to the vehicle to fully understand the surrounding environment and navigate in the real-world. Also, such systems may not provide sufficient information for implementing desired levels of ADAS. Therefore, a lidar system for creating a 3D scan of an environment augmented to a camera system may be desirable. However, a joint lidar and camera imaging system can be challenging to calibrate. For example, calibrations in 3D space based on 2D images is cumbersome for humans and training is costly. Further, calibrations may not account for sensor drift over time. Moreover, vehicle operators may not be able to readily identify the need for recalibration. Thus, there is a desire for a system and method for a joint image and lidar calibration system with cost-effective, semi-automated annotation and calibration features.

SUMMARY

Aspects of embodiments of the present disclosure are directed toward a system and method for calibration between a first detection system (e.g., a lidar system) and a second detection system (e.g., a camera imaging system).

According to an embodiment of the present disclosure there is provided a calibration system, the calibration system including: a processing circuit configured to: receive data corresponding to a first image from a first detector of a first detection system, the data including information corresponding to a 2D bird's eye view (BEV) of a scene; receive data corresponding to a second image from a second detector of a second detection system, the data including information corresponding to a 2D image of the scene from the second detector; determine a salient feature in the first image or the second image; project, based on a first calibration setting, the salient feature from the first image to the second image or from the second image to the first image; select a region corresponding to the projected salient feature in the first image or the second image; determine an identity of the salient feature; and determine a second calibration setting based on the identity of the salient feature and the selected region corresponding to the salient feature in the 2D BEV and the 2D image.

In one embodiment, the processing circuit is further configured to: determine a re-projection error for the identified salient feature by utilizing intrinsic parameters and extrinsic parameters; and compare the determined re-projection error with a threshold to determine whether a re-calibration is needed.

In one embodiment, the first detection system includes a lidar system.

In one embodiment, the second detection system includes a camera imaging system.

In one embodiment, the processing circuit is further configured to: project, based on the determination of a salient feature in the first image or the second image, a bounding box region in the corresponding first image or the corresponding second image for suggesting placement of a second bounding box.

In one embodiment, the processing circuit is configured to determine the second calibration setting while a vehicle is online and to apply the second calibration setting to the vehicle while the vehicle is online.

In one embodiment, the second calibration setting is based on three or more salient features.

In one embodiment, the processing circuit includes an integrated circuit chip.

In one embodiment, the processing circuit is configured to determine the salient feature in the first image or the second image according to an object detection system and to select the region corresponding to the projected salient feature in the first image or the second image according to the object detection system.

In one embodiment, the object detection system is configured to detect objects at a first rate when the determined re-projection error is greater than a first threshold and to detect objects at a second rate when the determined re-projection error is greater than a second threshold.

According to an embodiment of the present disclosure there is provided a calibration method, the calibration method including: receiving, by a processing circuit, data corresponding to a first image from a first detection system, the data including information corresponding to a 2D bird's eye view (BEV) of a scene; receiving, by the processing circuit, data corresponding to a second image from a second detection system, the data including information corresponding to a 2D image of the scene; determining, by the processing circuit, a salient feature in the first image or the second image; projecting, by the processing circuit, based on a first calibration setting, the salient feature from the first image to the second image or from the second image to the first image; selecting, by the processing circuit, a region corresponding to the projected salient feature in the first image or the second image; determining, by the processing circuit, an identity of the salient feature; and determining, by the processing circuit, a second calibration setting based on the identity of the salient feature and the selected region corresponding to the salient feature in the 2D BEV and the 2D image.

In one embodiment, the calibration method further includes: determining, by the processing circuit, a re-projection error for the identified salient feature by utilizing intrinsic parameters and extrinsic parameters; and comparing, by the processing circuit, the determined re-projection error with a threshold to determine whether a re-calibration is needed.

In one embodiment, the first detection system includes a lidar system.

In one embodiment, the second detection system includes a camera imaging system.

In one embodiment, the calibration method further includes projecting, by the processing circuit, based on the determination of a salient feature in the first image or the second image, a bounding box region in the corresponding first image or the corresponding second image for suggesting placement of a second bounding box.

In one embodiment, the calibration method further includes determining, by the processing circuit, the second calibration setting while a vehicle is online and applying the second calibration setting to the vehicle while the vehicle is online.

In one embodiment, the second calibration setting is based on three or more salient features.

In one embodiment, the processing circuit includes an integrated circuit chip.

In one embodiment, the calibration method further includes determining, by the processing circuit, the salient feature in the first image or the second image according to an object detection system and selecting, by the processing circuit, the region corresponding to the projected salient feature in the first image or the second image according to the object detection system.

In one embodiment, the calibration method further includes detecting objects at a first rate, utilizing the object detection system, when the determined re-projection error is greater than a first threshold and detecting objects at a second rate, utilizing the object detection system, when the determined re-projection error is greater than a second threshold.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

These and other features and aspects of the present disclosure will be appreciated and understood with reference to the specification, claims, and appended drawings wherein:

DETAILED DESCRIPTION

Figure 1A:
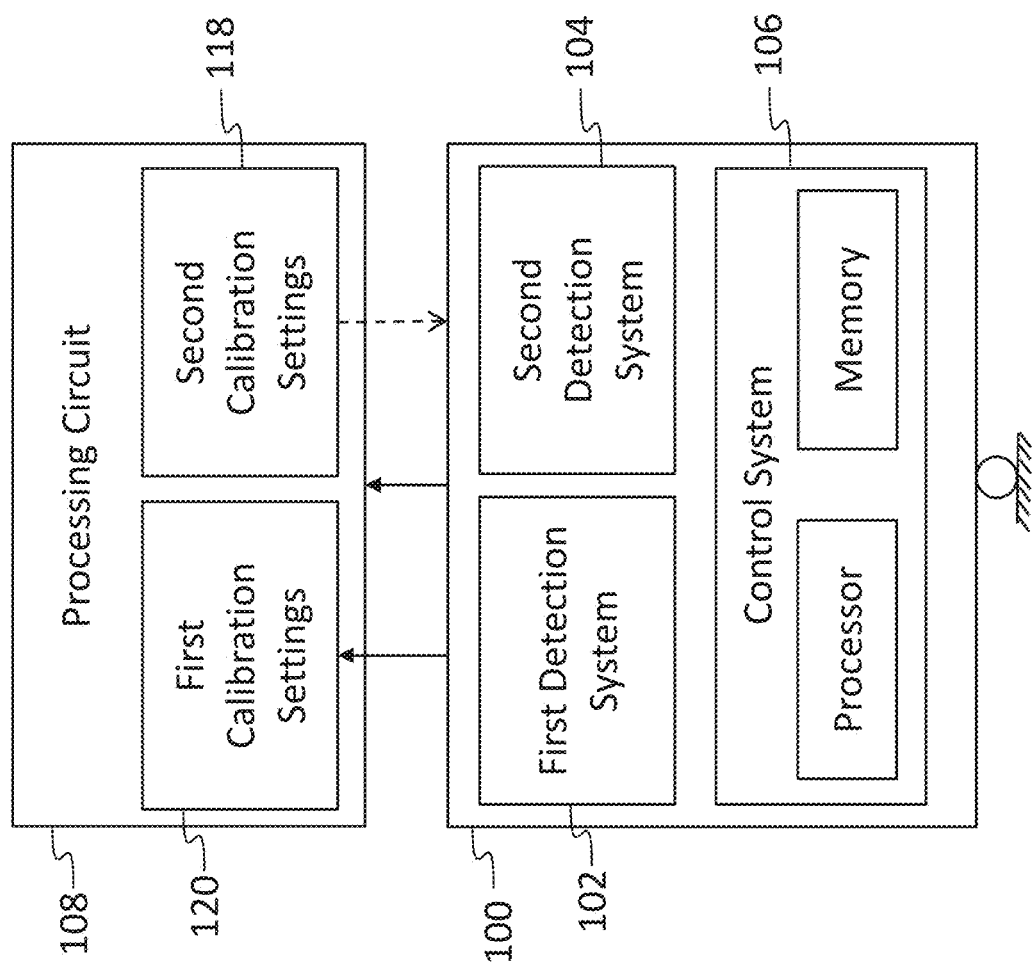
FIG. 1A is a block diagram including components of a vehicle, according to an embodiment of the present disclosure.

The detailed description set forth below in connection with the appended drawings is intended as a description of example embodiments of system and method for accurate calibration between lidar and camera sensors provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the spirit and scope of the present disclosure. As denoted elsewhere herein, like element numbers are intended to indicate like elements or features.

Aspects of some embodiments of the present disclosure are directed to a system and method for a semi-automated, efficient calibration between lidar and camera sensors. Aspects of some embodiments of the present disclosure are directed to a system and method that improves a 3D data collection and an annotation pipeline by transforming 3D data to a 2D space (for example, information captured in the form of 3D data is mapped for visualization in a 2D image). In some embodiments, the system and method may include using a 2D bird eye view ("BEV") based on lidar data and a 2D camera image view based on camera data to provide a fast and efficient system for annotating 3D objects for calibration, recalibration, and/or verification purposes. In some embodiments, the system and method may automatically find the corresponding points for each view such that an annotator can quickly navigate in space (e.g., a 2D and/or 3D space). In some embodiments, calibration/recalibration occurs based on an annotator's selection of bounding boxes and objects in the 2D BEV and/or 2D camera image view. In some embodiments, calibration/recalibration may be based on clues given by an annotator for salient surfaces and/or salient features. In some embodiments, the system and method include fast and accurate 2D annotation according to initial calibration settings for 3D data using offline data post data collection (i.e., using data collected while the vehicle was online). Therefore, in some embodiments, the system and method perform calibration, recalibration, and/or verification of calibration settings using an annotator's input to compensate for any discrepancies or sensor drift that might occur.

Aspects of some embodiments of the present disclosure are directed to a system and method that automatically perform recalibration while a vehicle is in motion or is powered on (e.g., when one or more systems of the vehicle are online). In some embodiments, the system and method include an object detection system to automatically perform calibration, recalibration, and/or verification of calibration settings in real-time. In some embodiments, the system and method include a two-tier threshold system (or a multi-tier threshold system having greater than 2 tiers) with two (or more) object detection capture modes to enhance safety for the driver and passengers of the vehicle.

With reference now to FIG. 1A, a vehicle 100 includes a first detection system 102, a second detection system 104, and a control system 106. In some embodiments, the vehicle includes a processing circuit 108 for performing calibration, recalibration, and/or verification. In some embodiments, the processing circuit 108 is remote with respect to the vehicle 100. In some other embodiments, the processing circuit 108 may including multiple redundant processing circuits that are provided at both the vehicle and at one or more remote locations, respectively. In some other embodiments, some components of the processing circuit 108 may be located at the vehicle while other components of the processing circuit 108 may be located at one or more remote locations.

In some embodiments, the first detection system 102 is a Light Detection and Ranging ("lidar") system. The lidar system may scan the environment around the vehicle 100 and may generate 3D point cloud data. The 3D point cloud data may convey information about objects and/or the environment surrounding the first detection system 102. In some embodiments, the lidar system includes a laser source and a first detector, a high-precision timer, a global position system (GPS), an inertial measurement unit (IMU), and a data management system. Together, these components enable the lidar system to generate a set (e.g., a sparse set) of 3D point clouds. For example, the lidar system may generate 3D point clouds based on measured distances from a surface using light in the form of a pulsed laser. In some embodiments, the lidar system data including 3D point cloud data may be transmitted to the control system 106 and/or the processing circuit 108 for storage and/or processing. Although the first detection system 102 is described as a lidar system, the first detection system may be any other suitable system capable of generating 3D point cloud data.

In some embodiments, the second detection system 104 is a camera imaging system including one or more cameras (e.g., a second detector) coupled to the vehicle 100 to capture images around the exterior of the vehicle 100. In some embodiments, the one or more cameras may be facing different directions relative to the vehicle 100. For example, the one or more cameras may be set up to capture images in forward, rearward, rightward, and/or leftward directions. In some embodiments, the one or more cameras may be set up to capture images in any other suitable or desired direction. The one or more cameras may capture overlapping images from the same or different perspectives to create a single, merged image. The camera imaging system data including the camera image data may be transmitted to the control system 106 and/or processing circuit 108 for storage and/or processing. Although the second detection system 104 is described as a camera imaging system, the second detection system may be any other suitable system capable of capturing images around the exterior of the vehicle.

In some embodiments, the control system 106 includes a processor and memory such that the control system 106 may store and manage calibration settings for calibrating the first detection system 102 and/or the second detection system 104 (e.g., alignment between 3D point cloud data from the first detection system and 2D camera images from the second detection system and intrinsic parameters (e.g., intrinsic camera parameters)). In some embodiments, the calibration settings are set according to any suitable technique known in the art, for example, techniques for determining calibration settings are described in Zhang, Zhengyou, "A Flexible New Technique for Camera Calibration." Technical Report MSR-TR-98-71 (1998) (last updated on Aug. 13, 2008), the entire content of which is incorporated by reference herein. For example, the calibration procedure includes capturing at least two images, detecting feature points in the at least two images, estimating five intrinsic parameters and all of the extrinsic parameters using a closed-form solution, estimating the coefficients of the radial distortion by solving the linear least-squares, and refining the parameters through minimizing a functional. The calibration settings (e.g., first calibration settings) may be set initially to factory settings by the vehicle manufacturer.

In some embodiments, the first detection system 102 (e.g., a lidar system) and the second detection system 104 (e.g., a camera imaging system) concurrently (e.g., simultaneously) record or collect data while the vehicle 100 is powered on (e.g., one or more systems of the vehicle 100 is online). The first detection system 102, the second detection system 104, and/or the control system 106 may use a timestamp, location data, position data, and/or any other suitable method of associating lidar data with camera images capturing the same scene or environment from the same or different perspectives for later review (e.g., offline calibration, recalibration, or verification) and/or processing.

In some embodiments, the control system 106 and/or the processing circuit 108 include an object detection system for enabling the vehicle 100 to detect, identify, or determine salient features in the real world based on data provided by the first detection system 102 and/or the second detection system 104. For example, the first detection system 102 may provide 3D point cloud data, and the second detection system 104 may provide camera image data. Using the 3D point cloud data and camera image data, the object detection system may use a trained neural network to detect, identify, or determine salient features. Salient features, according to embodiments of the present disclosure, refer to regulated objects that have fixed, regulated, or known dimensions in the real world that can be used as a standard for calibration, recalibration, or verification purposes. In some embodiments, salient features include stop signs, crosswalks, road lines, license plates, traffic lights, and/or any other suitable standardized object (i.e., an object or component of an object having a known height, width, length, or any other dimension in the real world). In this manner, salient features provide real-world information that is useful for determining the accuracy of alignment between 3D point cloud data and 2D camera images for calibration, recalibration, and/or verification purposes.

In some embodiments, the processing circuit 108 receives at least the first calibration settings 120, first detection system data (e.g., lidar data from a first detector), and second detection system data (e.g., camera image data from a second detector) from the vehicle 100 for calibration, recalibration, and/or verification of the first calibration settings 120. The processing circuit 108 may determine second calibration settings 118 based on corresponding points between the 3D point cloud data and the 2D camera image data. By way of example, a corresponding point may refer to a corner of an object in a 3D point cloud that corresponds to a corner of an object captured in the 2D camera image. Calibration settings may be based on at least three corresponding points. According to some embodiments, for improved performance, calibration settings are based on at least 40 corresponding points. In other embodiments, calibration settings may be based on up to 40 corresponding points. By way of example, provided that the corresponding points are accurate, the greater number and/or variety of positions in the calibration volume would result in a greater calibration setting accuracy. In some embodiments, the processing circuit 108 may transmit the second calibration settings 118 to the first detection system 102, the second detection system 104, and/or the control system 106 to replace or supplement the first calibration settings 120.

In some embodiments, the processing circuit 108 may be a single silicon chip (e.g., a system on chip (SoC)). In some embodiments, the processing circuit 108 may be implemented in any suitable number and types of chips that are known to those skilled in the art. By way of example, the processing circuit 108 may include suitable one or more of software and hardware including FPGA, ASIC, CPU, GPU, RAM, SRAM, DRAM, ROM, EPROM, EEPROM, NAND Flash memory, and/or any other suitable chips or components of a chip, and/or one or more discrete analog or digital elements, where one or more of these components and/or functions may be integrated in a single chip.

While the processing circuit 108 and the vehicle 100 are illustrated as separate boxes in FIG. 1, in some embodiments, the processing circuit 108 is a component of the vehicle 100 or is a component of a device that is located remotely with respect to the vehicle 100. Further, in some embodiments, the functions of the control system 106 may be performed by the processing circuit 108 and vice versa depending on the configuration of components within the vehicle 100 or the device that is located remotely with respect to the vehicle 100. In some embodiments, functions of the control system 106 and/or functions of the processing circuit 108 may be performed independently or jointly with each other.

Figure 1B:
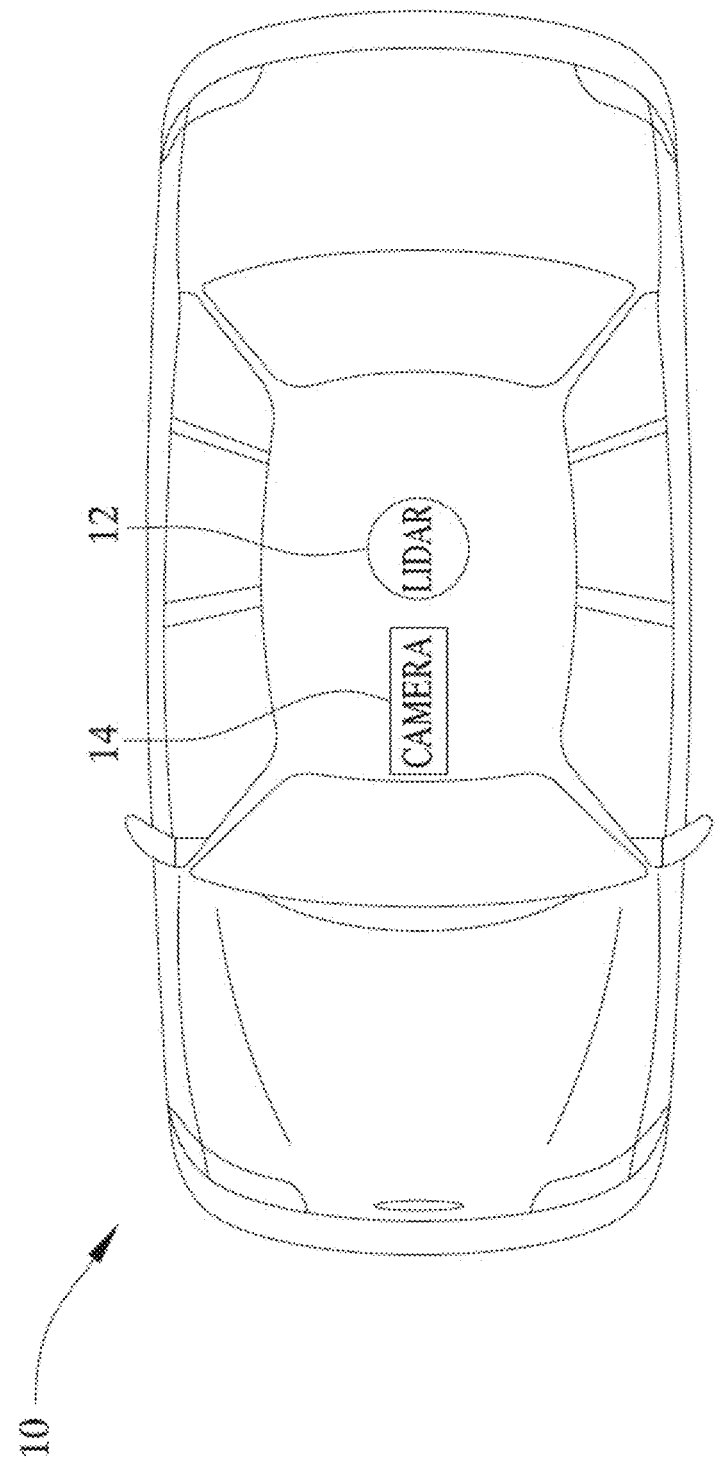
FIG. 1B is a schematic view of a vehicle having a lidar system and camera image system according to an embodiment of the present disclosure.

With reference now to FIG. 1B, in some embodiments, a lidar system 12 may be mounted on a vehicle 10. In some embodiments, one or more cameras 14 may be coupled to the vehicle 10. In some embodiments, the one or more cameras may be directed in a forward, rearward, rightward, and/or leftward direction. Although positions are provided for the lidar system and the one or more cameras in FIG. 1B, in some embodiments, the lidar system and a camera imaging system including the one or more cameras may be at any other suitable position.

Figure 2:
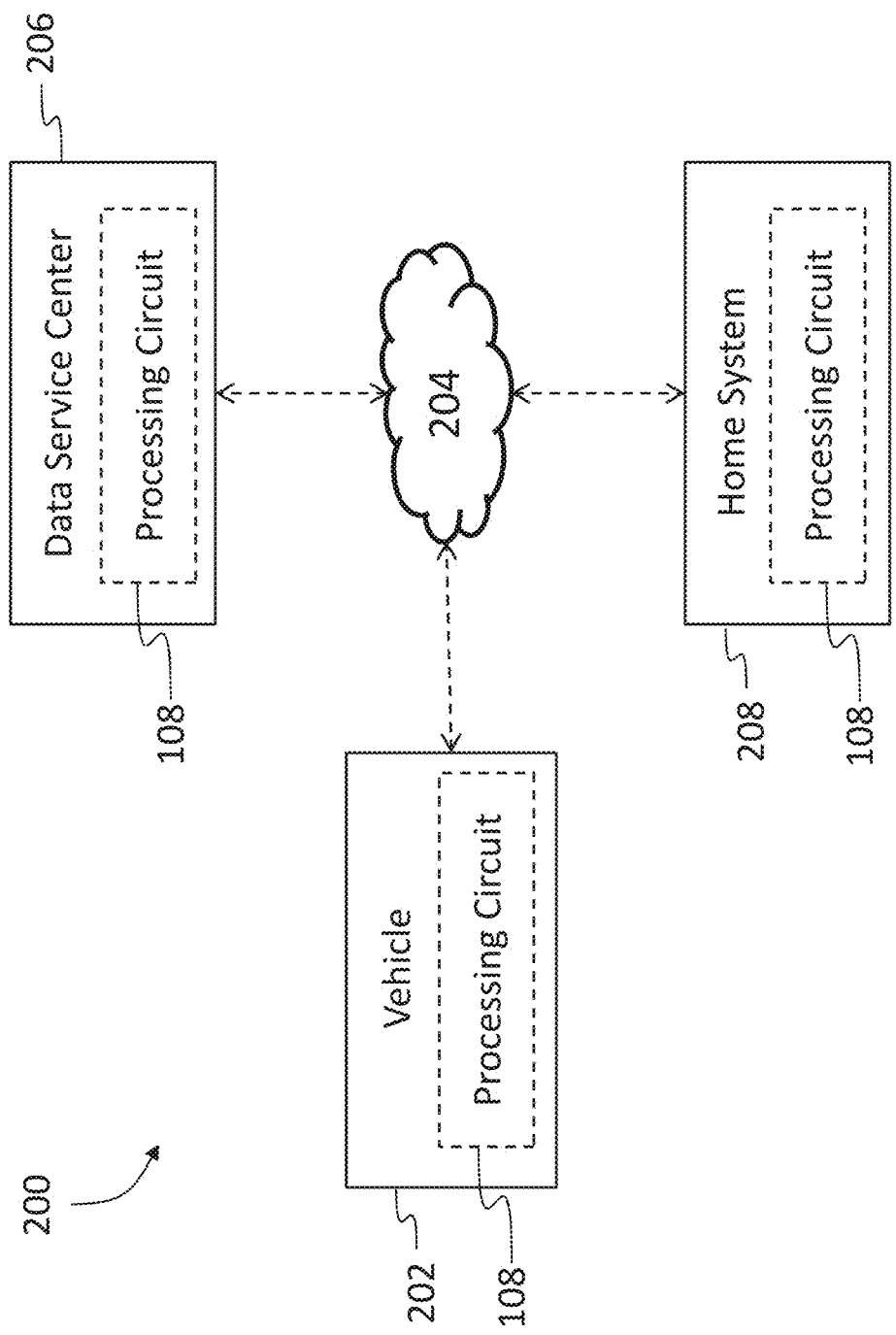
FIG. 2 is block diagram of an electronic communication system, according to an embodiment of the present disclosure.

With reference now to FIG. 2, a vehicle 202 may electronically communicate over a network as part of an electronic communication system 200, according to some embodiments of the present disclosure. The electronic communication system 200 includes a vehicle 202, a data communications network 204, a data service center 206, and/or a home system 208.

The vehicle 202 is connected to a data service center 206 and/or the home system 208 over a data communications network 204, such as, for example, a local area network or a wide area network (e.g., a public Internet). The electronic communication system 200 includes one or more software modules for coordinating interactions between the vehicle 202, the data service center 206, and/or the home system 208.

The data service center 206 may include, for example, any manufacturer or third-party service center configured to collect data from the vehicle 202 for performing calibration, recalibration, and/or verification of calibration settings in real-time and/or while the vehicle is offline. For example, while the vehicle 202 is in motion and collecting data (e.g., lidar data and/or camera data), annotators may monitor the data, annotate the data, and/or transmit second calibration settings to the vehicle 202 as determined by a processing circuit. In some embodiments, the data service center 206 has access to one or more vehicles and may stored data from other vehicles to supplement or assist in determining appropriate calibration settings for the vehicle 202.

The home system 208 may include, for example, a home electronic device configured to collect data from the vehicle 202 for performing calibration, recalibration, and/or verification of calibration settings in real-time and/or while the vehicle is offline in the same manner as or similar manner to the data service center 206.

In some embodiments, the vehicle 202, the data service center 206, and/or the home system 208 may have a processing circuit 108 to perform calibration, recalibration, and/or verification of calibration settings jointly or independently depending on the mode of operation. For example, in one embodiment, the processing circuit 108 is located on the vehicle only. In another embodiment, the processing circuit 108 is located only at the data service center 206, or is located only at the home system 208.

According to some embodiments of the present disclosure, one or more vehicles (e.g., vehicle 202 and other vehicles) may connect to the data communications network 112 using a satellite connection, cable connection (e.g., while the vehicle 202 is offline), radio frequency communication, or any other suitable wired or wireless data communication mechanism. Therefore, data may be shared between vehicles, home systems, and/or a data service center to perform annotation to calibrate, recalibrate, and/or verify calibration settings for one or more vehicles while the vehicles are online or offline.

Figure 3:
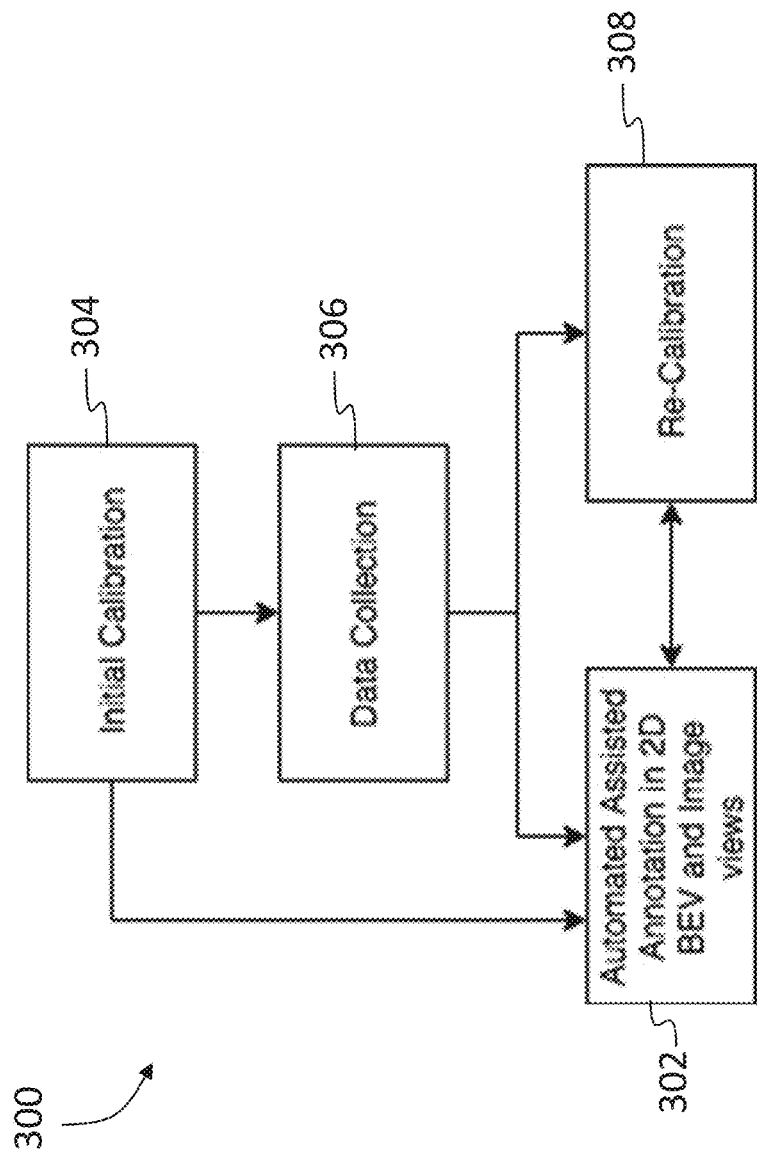
FIG. 3 is a flow chart of an offline annotation method, according to an embodiment of the present disclosure.

With reference now to FIG. 3, the method 300 of the present disclosure includes a semi-automated or assisted annotation method 302 using a hybrid view (e.g., a joint 2D BEV and 2D image view). In some embodiments, the first calibration settings may be based on an initial calibration 304 which includes calibration settings between sensors for the first detection system and the second detection system. The first calibration settings enable alignment between 3D point cloud data of a lidar system and 2D camera images of a camera imaging system. While generating the initial data, such factors as, sensor drift, errors in the test data, and/or specific conditions for each vehicle 100 may not have been considered. Sensor drift may include the physical vibration, physical rotation, physical misalignment, general degradation of the sensors (e.g., sensor hardware) over time, and/or other errors that cause poor performance. Therefore, in some embodiments, it may be desirable to adjust or recalibrate 308 the settings after data collection 306 (e.g., real-world data collected during normal operation of the vehicle 100).

Figure 4:
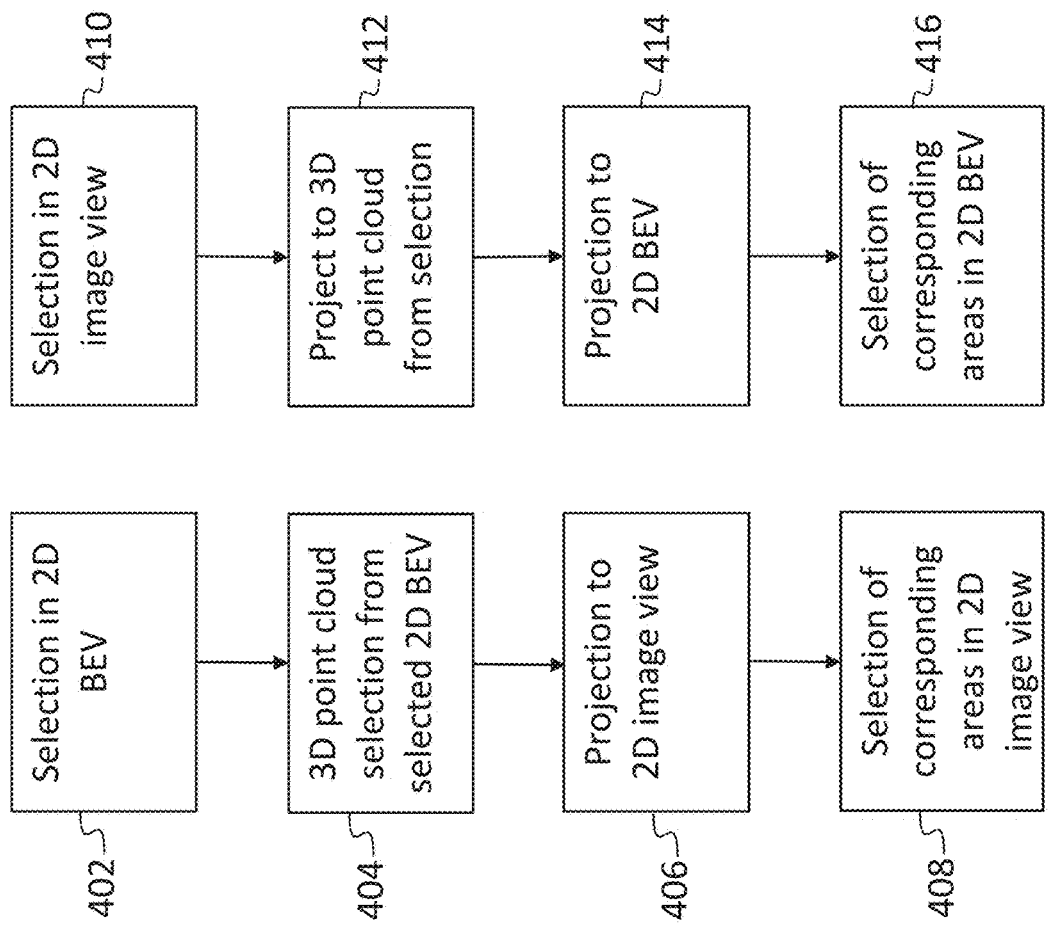
FIG. 4 is a flow chart of a method for performing a conversion from a 2D bird's eye view to a 2D image view and vice versa, according to an embodiment of the present disclosure.

With reference now to FIG. 4, semi-automated or assisted annotation method 302 using a hybrid view may be enabled by the processing circuit 108 for performing a conversion from bird's eye view image to a camera view image and vice versa.

In some embodiments, as shown in the left column of FIG. 4, an annotator may select or determine a region in the 2D BEV 402 of the hybrid view. In some embodiments, the annotator selects the region corresponding to a salient feature or an object in a user interface, and the processing circuit 108 uses this selection to determine, provide, or suggest a first bounding box around the salient feature based on an object detection system. The annotator may then adjust either one of the first bounding box or the second bounding box (e.g., the second bounding box as described in more detail below) to more accurately define the object or salient feature in the BEV or leave the determination of the first bounding box and/or the second bounding box as suggested by the processing circuit 108. In some embodiments, both the first bounding box and the second bounding box may be adjusted by the annotator. In some embodiments, the annotator manually places or sets the first bounding box around a salient feature or an object without assistance from an object detection system.

In some embodiments, the processing circuit 108 receives the selection or determination in the 2D BEV 402 and determines the corresponding 3D point cloud selection based on the selected 2D BEV 404. In other words, the annotator may select or determine, in a 2D BEV, a region or salient feature within a first bounding box on the user interface, and the processing circuit 108 may determine the corresponding points in the 3D point cloud. Accordingly, the processing circuit 108 simplifies the process for an annotator because the annotator does not need training on how to navigate in 3D space to select portions of the 3D point cloud. In this manner, the annotation process is semi-automated or assisted by the processing circuit 108, thereby reducing errors, improving efficiency, and/or reducing training time.

In some embodiments, the processing circuit 108 maps or projects the 3D point cloud selection or determination to a 2D image view 406 for display by the user interface. The projection from lidar point cloud to image plane is obtained through camera matrix transformation shown in Equation 1.

$$I = P \cdot S \quad \text{Equation 1.}$$

I is homogenous image coordinates $$\begin{bmatrix} U \\ V \\ W \end{bmatrix}$$

P is a projection matrix, and S is homogenous lidar scene coordinates $$\begin{bmatrix} X \\ Y \\ Z \\ 1 \end{bmatrix}.$$

The 2D picture can then be obtained by Equation 2:

$$\begin{bmatrix} u \\ v \\ 1 \end{bmatrix} = \frac{1}{W} \begin{bmatrix} f & 0 & 0 & 0 \\ 0 & f & 0 & 0 \\ 0 & 0 & 1 & 0 \end{bmatrix} \begin{bmatrix} X \\ Y \\ Z \\ 1 \end{bmatrix}. \quad \text{Equation 2}$$

Therefore, the processing circuit 108 may map or project any region or area selected or determined in the 2D BEV to the corresponding regions or areas in the 2D image view. Because selection or determination occurs from a BEV, there may be some ambiguity in the height of the projected region in the 2D image view that is not a BEV (e.g., a side view).

Therefore, in some embodiments, the processing circuit 108 may project or determine a column, vertical band, or bounding box region to the 2D image view for display on the user interface. In some embodiments, the annotator may select a subset of the bounding box region to set or define the second bounding box (e.g., adjust the height of the bounding box if desired) on the user interface. In this manner, the bounding box region and user interface may assist the annotator in selecting a corresponding area or region in the 2D image view 408 for a second bounding box to define the object or the salient feature completely (i.e., the object is defined within a 3D bounding box based on at least two 2D bounding boxes).

In some embodiments, the processing circuit 108 determines or provides the second bounding box instead of a bounding box region on the user interface for the annotator to adjust or reposition. In this case, the height may be determined by the processing circuit 108 based on calibration settings and/or an object detection system. Therefore, the processing circuit 108 may assist the annotator with setting a second bounding box which reduces errors, improves annotation efficiency and reduces the burden on an annotator. While semi-automated or assisted automation is described, in some embodiments, the annotator may determine the second bounding box manually without assistance based on the projected selection to the 2D image view 406.

According to some embodiments, performing acts 402, 404, 406 and 408 enables the processing circuit 108 to completely determine or define a salient feature or an object, thereby allowing determination of re-projection error for the identified salient feature or the object. Although the re-projection error may be determined based on a single identified salient feature, in some embodiments, the re-projection error is determined based on a plurality of identified salient features to improve results. In some embodiments, a plurality of re-projection errors is determined for each identified salient feature and, in some embodiments, a single re-projection error is determined based on the aggregation of results for each salient feature. In some embodiments, three or more salient features may be desirable within the same or separate views (e.g., views captured at different times and/or places).

While the embodiments of FIG. 4 have been described based on a selection in the 2D BEV followed by a selection in the 2D image view, in some embodiments, this method may also be performed in reverse order with suitable changes (e.g., an inverse matrix projection may be used to project from 2D image view selection to 3D point cloud and then to 2D BEV). Therefore, as shown in the right column of FIG. 4, the annotator may select a region in the camera image 410. The processing circuit 108 may project the selection to the 3D point cloud from the selection in the camera image 412 and project the 3D point cloud to a 2D BEV 414. The annotator may then select corresponding areas in the 2D BEV 416 to completely define a salient feature or an object thereby allowing determination of a re-projection error. The semi-automated, assisted, and/or manual annotation features described with respect to acts 402, 404, 406 and 408 also apply to acts 410, 412, 414 and 416. Therefore, the annotator has the option to start by selecting a feature in the 2D BEV or the 2D image view.

Figure 5:
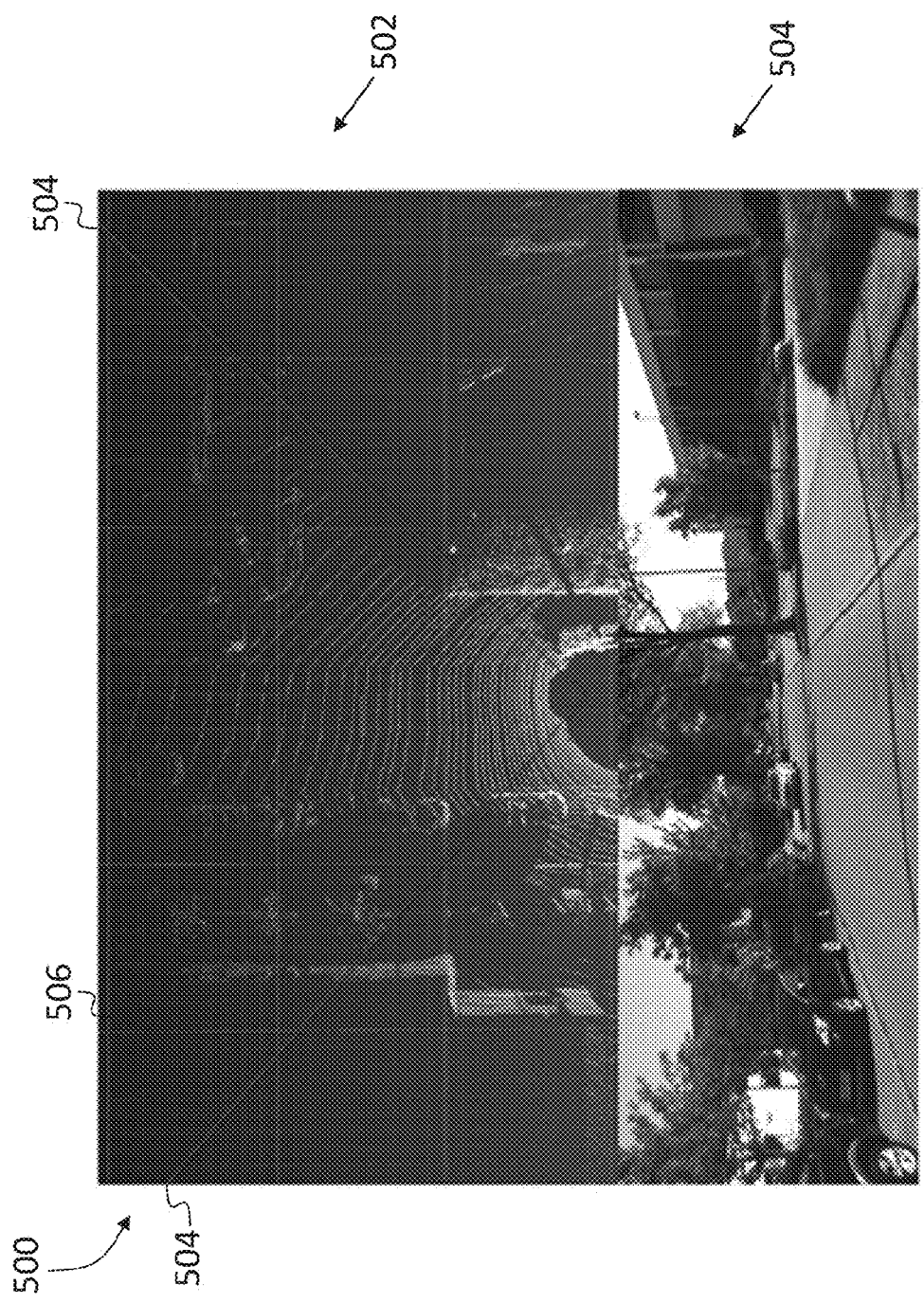
FIG. 5 is a hybrid bird's eye view and side image view, according to an embodiment of the present disclosure.
Figure 6:
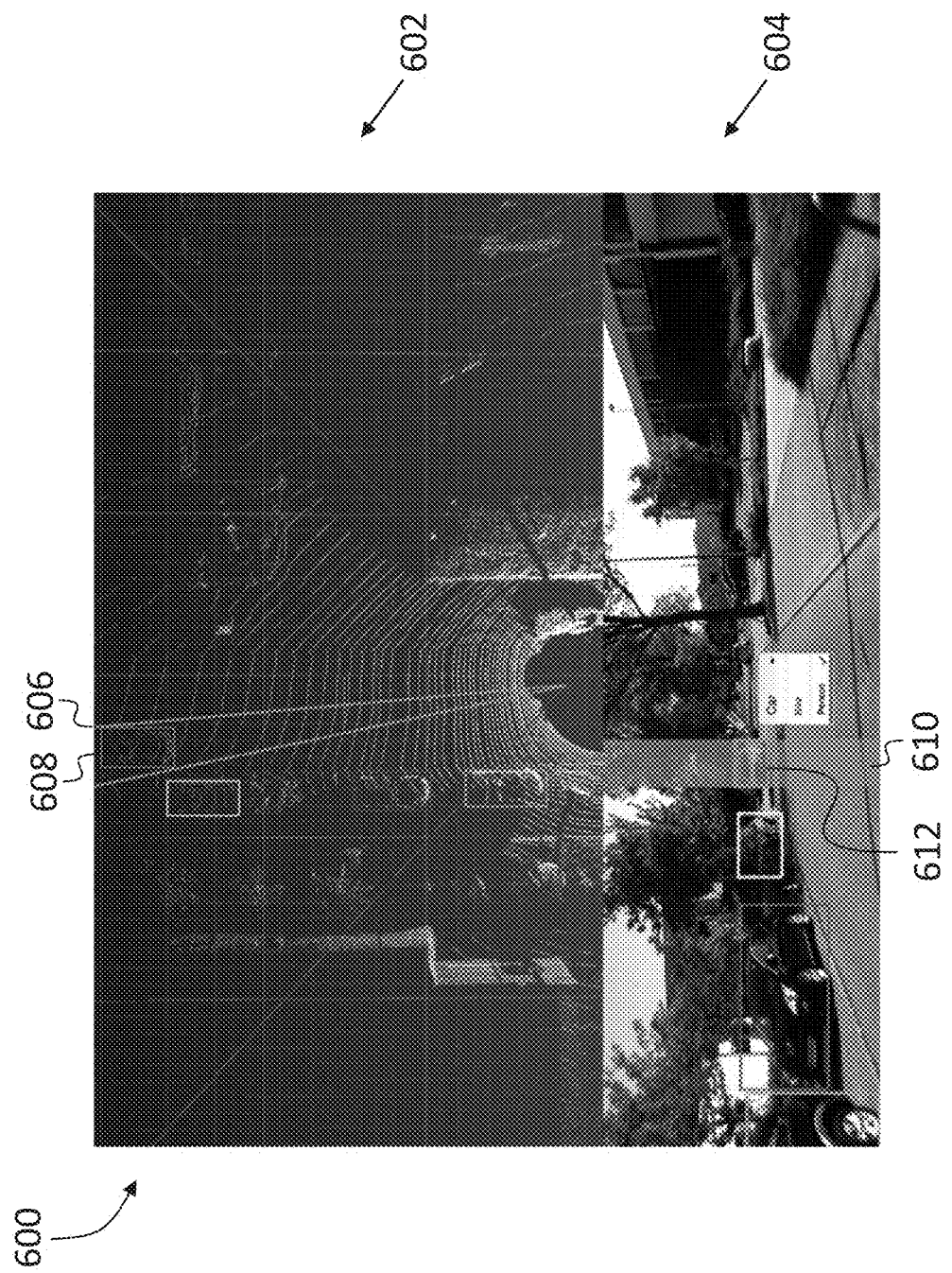
FIG. 6 is a hybrid bird's eye view and side image view, according to an embodiment of the present disclosure.
Figure 7:
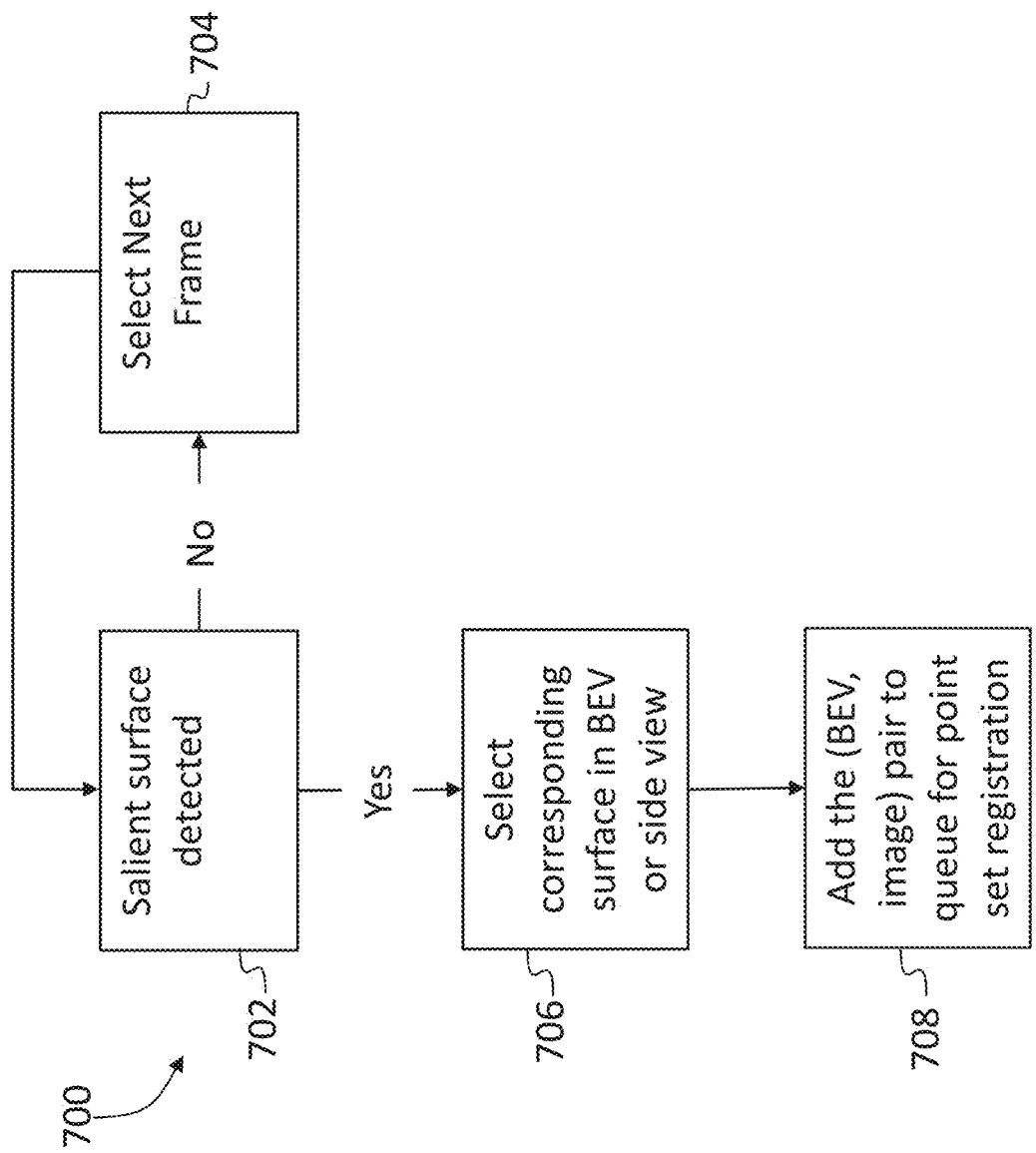
FIG. 7 is a flow chart of an annotation workflow, according to an embodiment of the present disclosure.

FIGS. 5-7 illustrate different views of the user interface that an annotator may encounter when performing the calibration, recalibration, or verification process according to some embodiments of the present disclosure.

With reference now to FIG. 5, the processing circuit 108 may generate images and data to display on a user interface.

In some embodiments, a human annotator or non-human annotator (e.g., an object detection system or any other automated system) may use the user interface to verify the accuracy of the first calibration settings 120 and/or determine second calibration settings 118. The user interface may display a hybrid view 500 including a 2D BEV 502 and 2D side image view 504 to an annotator. As shown in FIG. 5, the hybrid view 500 includes a 2D BEV 502 adjacent to (e.g., above) a 2D side image view 504. The hybrid view 500 enables the annotator to concurrently view both the 2D BEV 502 and corresponding 2D side view 504 during the annotation process. In some embodiments, the user interface allows the annotator to determine calibration settings without having to navigate in 3D space. Therefore, the calibration/recalibration system and method of the present disclosure avoids the cumbersome and challenging process of requiring annotators to navigate in 3D space to recalibrate the calibration settings of the vehicle 100. In some embodiments, the 2D BEV 502 is generated based on 3D point cloud data determined by a lidar system. In some embodiments, the 2D side image view 504 is generated based on 2D camera image data determined by a camera imaging system.

In some embodiments, the 2D BEV 502 includes a top-down perspective (or a plan view) of a region adjacent or proximate to the vehicle 100. As used herein, a plan view is a view from a direction normal to a surface (e.g., surface of earth or a display surface). For example, the 2D BEV 502 may capture a 2 meter by 2 meter region including the front of the vehicle 100 and adjacent (e.g., directly adjacent) to the front of the vehicle 100. In some embodiments, the 2D BEV 502 includes the entire region surrounding the vehicle 100. For example, the 2D BEV 502 may display the surroundings of the vehicle 100 with the vehicle 100 centered in the top-down image of the 3D point cloud. In some embodiments, the annotator may manually adjust or shift (e.g., zoom in, zoom out, scan left, scan right, scan up, scan down, etc.) the 2D BEV to display different locations and annotate different features around the vehicle 100.

In some embodiments, the 2D side view 504 includes a side perspective view from the perspective of the vehicle 100. The 2D side view 504 may display features, objects, and/or surroundings concurrently captured by the 2D BEV 502. Therefore, in some embodiments, the annotator may view the same features, objects, and/or surroundings in both the 2D BEV 502 and the 2D side view 504. In some embodiments, when the annotator shifts the 2D BEV, the 2D side image view 504 shifts with the 2D BEV as appropriate to capture the same environmental features and vice versa.

In some embodiments, the user interface displays the 2D BEV 502 with an overlay including two diverging lines 504 (e.g., blue lines in FIGS. 5, 6 and 8) to assist a user in determining the features, objects, and/or surroundings captured by the 2D side view 504 as shown in FIG. 5. In other words, the two lines 504 of the overlay indicate the field of view for the concurrently (e.g., simultaneously) displayed 2D side view 504 of the hybrid view 500. As shown in FIG. 5, the user interface may display the 2D BEV overlaid with gridlines or a checkerboard 506 denoting different regions of the 2D BEV 502. Therefore, the overlay helps an annotator navigate and understand the hybrid view 500.

In some embodiments, the two diverging lines in the 2D BEV define the boundaries of a cone region in 3D lidar space with the vehicle 100 at the apex of the cone region. Therefore, any region selected in the 2D side view 504 will correspond to a portion of the cone region in 3D lidar space which may be mapped in the 2D BEV 502 and be automatically highlighted (e.g., as two green diverging lines indicating a bounding box region) on the user interface. Conversely, any region selected in the 2D BEV 502 may be mapped in the 2D side view 504 and be automatically highlighted (e.g., as a green vertical column or band indicating a bounding box region) on the user interface. In some embodiments, a different color bounding box is used to indicate different salient features or objects and the color of the automatically highlighted region corresponds to the color of the bounding box.

With reference now to FIG. 6, an annotator can select any region in the 3D BEV 602 or the 2D side view 604 and the processing circuit 108 may highlight the corresponding region in the other view of the hybrid view 600. For example, the annotator may create, adjust, or set a first bounding box 608 in the 2D BEV (e.g., a green box) 602. In response, the processing circuit 108 may determine the cone region corresponding to the first bounding box 608 in 3D lidar space and determine the corresponding region in the 2D BEV 602 with ambiguity being in the height of the corresponding region. Therefore, in some embodiments, the corresponding region in the 2D BEV 602 may be displayed on the user interface as a bounding box region 610. The annotator may select a subset of the bounding box region 610 to determine, adjust, or set a second bounding box 612. In some embodiments, the processing circuit 108 sets the height of the second bounding box 612 based on current calibration settings and/or an object detection system. According to some example embodiments, by determining the first bounding box 608 and the second bounding box 612, the annotator may define the object (e.g., a vehicle) completely.

In this manner, the 2D bounding boxes in the hybrid view may perform a function similar to a bounding box in 3D space without the need for a 3D navigation software. Therefore, some embodiments of the system and method bypass training needed to navigate the 3D virtual world and reduce the difficulty and associated costs with using trained annotators.

Based on the annotator's inputs, the system may determine associated calibration settings (e.g., second calibration settings). In some embodiments, the annotator may choose to replace the first calibration settings with the second calibration settings 118 at the annotator's discretion. In some embodiments, the annotator may store the second calibration settings 118 to apply at a later time. Therefore, the annotator may retain the second calibration settings pending further review or pending aggregation with additional data (e.g., additional corresponding points and/or historical calibration settings) to perform recalibration with increased accuracy.

In some embodiments, the second calibration settings 118 replace the first calibration settings (i.e., recalibration) based on a re-projection error. The re-projection error may be determined by comparing corresponding points based on the first calibration settings to corresponding point based on the second calibration settings 118 for one or more annotated objects or salient features. The re-projection error may consider salient features, intrinsic parameters, and extrinsic parameters. For example, intrinsic parameters may include focal length, principal point location, and distortion coefficients. Extrinsic parameters may include rotation and translation values between the sensors of the first detection system and the second detection system. The determined re-projection error may be compared to a threshold value to determine whether recalibration is needed (e.g., if error is greater than a threshold value, then initiate recalibration). In this case, recalibration may occur automatically without the annotator having to determine whether recalibration is appropriate. Therefore, the annotator may continually annotate objects or salient features while the processing circuit 108 concurrently evaluates whether recalibration is desirable. In some embodiments, the annotator may increase or decrease the threshold value to be more conservative or less conservative.

As shown in FIG. 6, a plurality of objects or salient features (e.g., four different cars) may be selected in the hybrid view 600. In some embodiments, a drop-down menu is provided for each bounding box such that the annotator may identify the objects (e.g., cars, pedestrian, bikes, etc.) defined within the 2D bounding boxes. In some embodiments, the annotator may create custom identifications for objects. In some embodiments, the object is identified for the annotator based on an object detection system. In some embodiments, the object is identified for the annotator based on an object detection system in addition to the calibration settings. In some embodiments, the bounding boxes for each unique object may be color coded by the annotator to distinguish the same and different objects in the 2D BEV 602 and the 2D side view 604. Therefore, the annotator may set a plurality of bounding boxes and identify a plurality of objects.

In some embodiments, the annotator may set a plurality of bounding boxes to identify a plurality of objects at a range of distances from the vehicle 100 to enhance the accuracy of the calibration/recalibration. The accuracy of the calibration data may depend on a number of factors. For example, the identity of the object, the number of corresponding points associated with the object between the 3D point cloud and 2D image view, and/or the relative locations of the objects on the hybrid view 600 (i.e., the diversity of salient feature locations in the field of view for both detection systems shown in the hybrid view 600).

While FIGS. 5 and 6 show a single hybrid view, in some embodiments, a plurality of hybrid views 600 with the same or different perspectives from each other may be used to capture additional objects to improve the accuracy of the calibration settings. While calibration settings may be based on corresponding points for a single object identified in the hybrid view 600 (e.g., in both the 2D BEV and the 2D side view), more preferably, four or more objects are desirable.

In some embodiments, the annotator may select bounding boxes specifically for salient features in the hybrid view 600. In some embodiments, the annotator may select bounding boxes for objects that are not salient features. In some embodiments, the processing circuit 108 may determine salient features based on the objects that are not salient features as a whole. In some embodiments, the salient features may be a component of or a subset of the object. For example, vehicles may have a variety of shapes and sizes but licenses plates on the car may have regulated dimensions (e.g., width and length). Therefore, the annotator may select a vehicle while the processing circuit 108 identifies the salient feature of the vehicle (e.g., the license plate) to use in the calibration/recalibration process. This identification may be based on calibration settings and/or an object detection system.

With reference now to FIG. 7, the annotation workflow 700 according to example embodiments of the present disclosure may include the annotator (e.g., a human annotator, driver, or an automated system) iteratively browsing image data until a salient surface is detected 702. If no salient surface is detected, then the next image frame 704 stored in the vehicle 100 is selected (or displayed) 704. After detecting a salient surface, the annotator may select any well-formed salient surfaces (e.g., a rectangular surface) in either the 2D BEV or 2D side view 706 and track the highlighted part in the corresponding view. The salient points can be from a plethora of surfaces including, for example, traffic signs. If the surface is visible in both the 2D BEV and the 2D side view, then the annotator may mark and select the surface in both views. In some embodiments, an algorithm will then perform line extrapolation in both the BEV and side view and find the corresponding points between both views using point registration. If the point registration confidence is high then the corresponding points will be added to a list 708 to estimate the P matrix described in Equation 1. In some embodiments, the object detection system outputs the detection accuracy of the salient features detected in both views to determine point registration confidence. If the point registration confidence is not high enough (e.g., above an adjustable threshold), the salient features being considered are discarded (i.e., the corresponding points are not added to the list 708).

Figure 8:
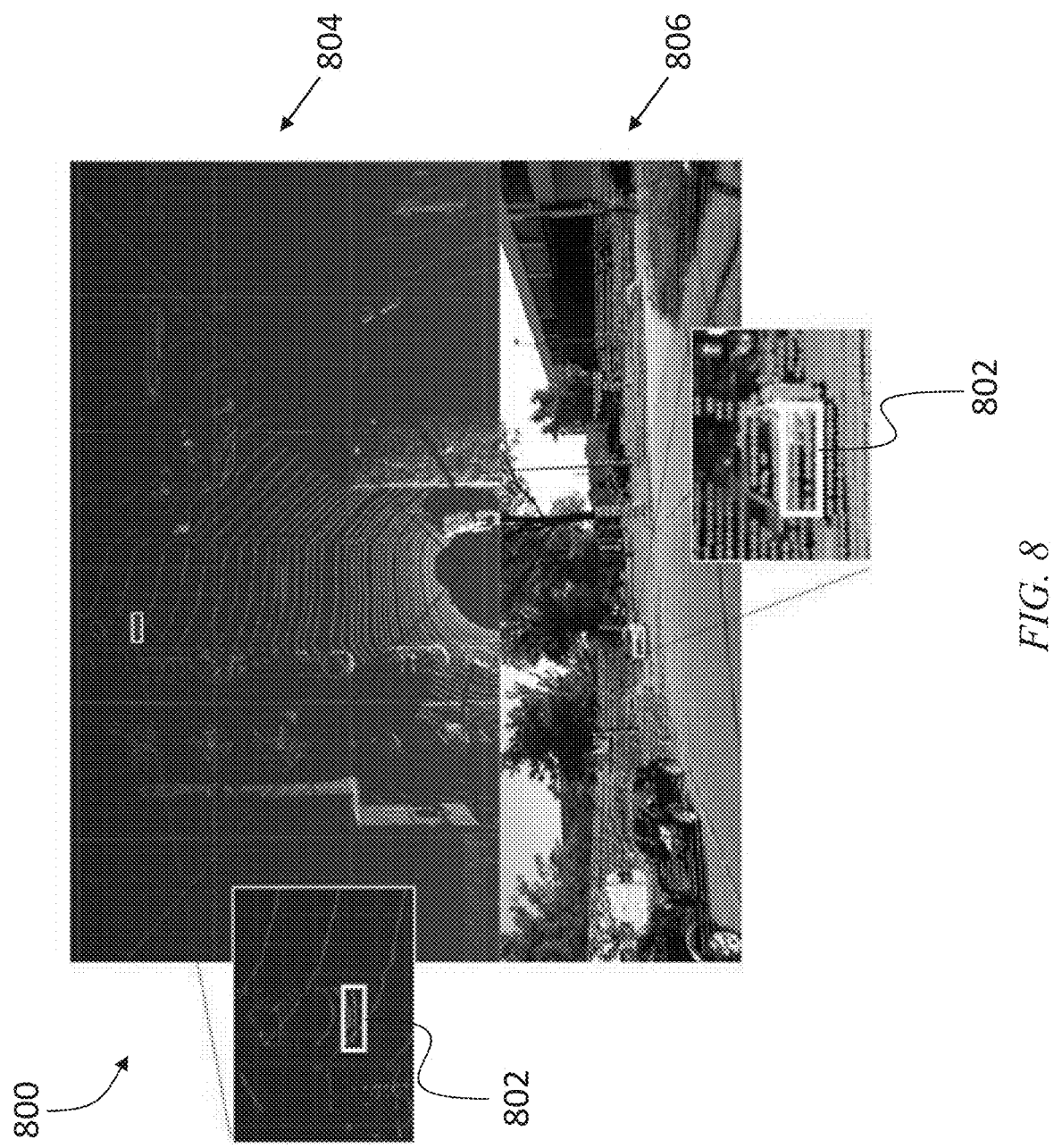
FIG. 8 is a hybrid bird's eye view and side image view, according to an embodiment of the present disclosure.

With reference now to FIG. 8, a salient feature (e.g., a license plate 802) may be identified in both the 2D BEV 804 and the 2D image view 806 as shown in the hybrid view 800. Given two corresponding surfaces in each view, outliers may be removed and an edge detection algorithm may be used to find corresponding corner points. The two corresponded point set $\{I_i\}$, i=1 . . . N and $\{S_i\}$, i=1 . . . N may be used to estimate P by minimizing least square error:

$$\Sigma_{i=1}^{N}\|I_i - P \cdot S_i\|^2. \qquad \text{Equation 3.}$$

To estimate P the correlation matrix for centroids is form as:

$$H = \sum_{i=1}^{N} I_{c,i} S_{c,i}. \qquad \text{Equation 4}$$

Then its singular value decomposition is computed as $H = U \Lambda U^T$ and the P matrix is estimated as:

$$\hat{P} = V U^T \qquad \text{Equation 5.}$$

As more corresponding pairs are added, the estimation of P may be improved. Therefore, calibration/recalibration may be performed based on the selection of salient rectangular regions.

As shown in FIG. 8, the user interface for an annotator may use different color points to indicate depth in the 2D image view (e.g., red points are closer to the vehicle 100 than blue points) based on data from the lidar system. Based on the color of the points, the annotator may be able to determine the relative position of different salient features being used as part of the calibration, recalibration, or verification process.

Figure 9:
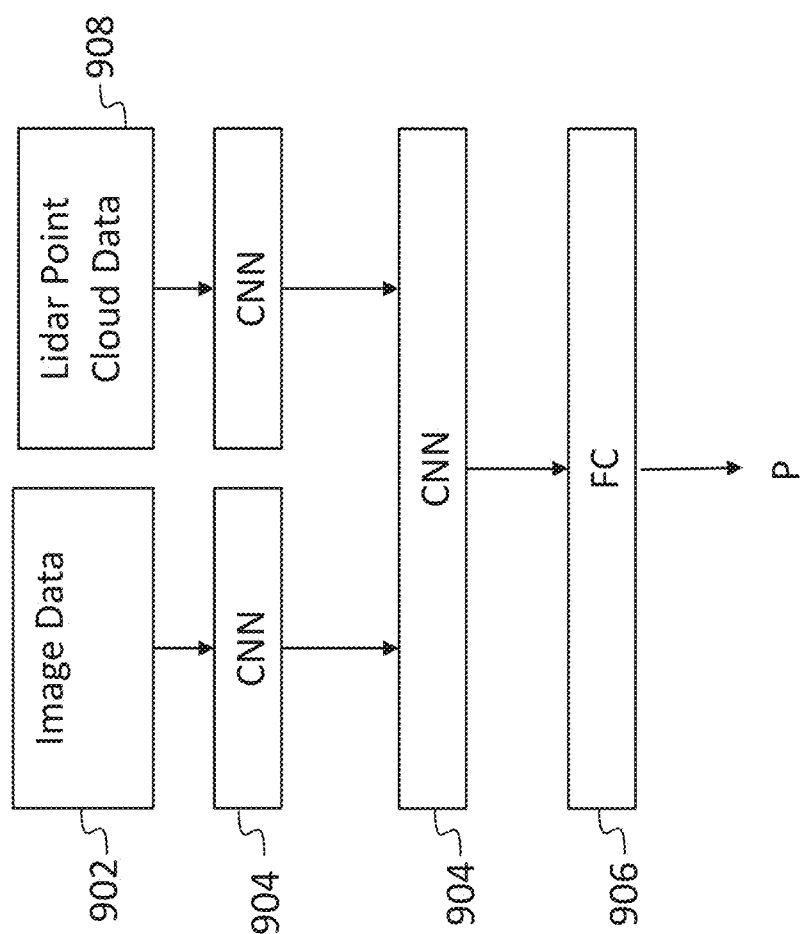
FIG. 9 is a flow chart of an online recalibration system using an object detection system, according to an embodiment of the present disclosure.

With reference now to FIG. 9, an online recalibration system may use a calibration surface algorithm which is a deep learning based object detection system for fully automating or semi-automating the verification or recalibration process. In some embodiments, the online recalibration system may use any suitable deep learning based object detection system known to those skilled in the art, for example, suitable techniques and systems as described in the follow references, the entire contents of which are incorporated by reference herein: 1) Girshick et al., "Rich feature hierarchies for accurate object detection and semantic segmentation" (2013) (last revised on Oct. 22, 2014), 2) Liu et al., "SSD: Single Shot MultiBox Detector" (2015) (last revised on Dec. 29, 2016), 3) He at al., "Mask R-CNN" (2017) (last revised on Jan. 24, 2018), 4) Girshik, Ross, "Fast R-CNN" (2015) (last revised on Sep. 27, 2015), 5) Dai et al., "R-FCN: Object Detection via Region-based Fully Convolutional Networks" (2016) (last revised Jun. 21, 2016). In some embodiments, a convolutional neural network (CNN) technique may be used for the analysis of images based on a training set. In some embodiments, the CNN is trained based on a training set including a large collection of objects (e.g., traffic lights and other calibration surfaces). In some embodiments, the training set includes training data (e.g., lidar data and camera system data) such as images containing features or objects (e.g., stop signs, traffic lights, etc.) determined by an annotator while the vehicle is offline. In some embodiments, the training set is supplemented and/or based on data from the offline system and method described in FIGS. 1-7.

As shown in FIG. 9, the image data 902 and lidar point cloud data 908 pass through a series of convolutional layers 904 and a fully connected layer 906 to get an output that captures salient features (e.g., calibration objects) of the image 902 and lidar point cloud 908. This information is used in some embodiments to estimate the projection matrix P for aligning the lidar point cloud and the image.

In some embodiments, the calibration deep-learning algorithm will detect an object (e.g., a car) in the lidar data and/or the 2D camera image and extract a salient feature (e.g., a license plate). Using the 3D point cloud lidar data and the 2D camera image data, the algorithm may determine a re-projection error and calibration settings in a manner similar to the method described in FIGS. 1-7. For example, the algorithm may perform line extrapolation and find the corresponding points between the lidar 3D point cloud and the camera image using point registration.

In some embodiments, the re-projection error may be used to notify an operator of the vehicle in real-time that recalibration is desirable by comparison to a threshold value (e.g., the re-projection error is greater than or exceeds a threshold value). In some embodiments, the threshold value is programmable and may be freely adjusted to a higher or lower value. In some embodiments, a vehicle operator may increase or decrease the threshold value to be more conservative or less conservative while the vehicle 100 is online (e.g., powered on). In some embodiments, automatic recalibration may be based on one or more salient features having a re-projection error greater than the threshold value. For example, recalibration may not occur until two or more salient features have a re-projection error greater than the threshold value.

Figure 10:
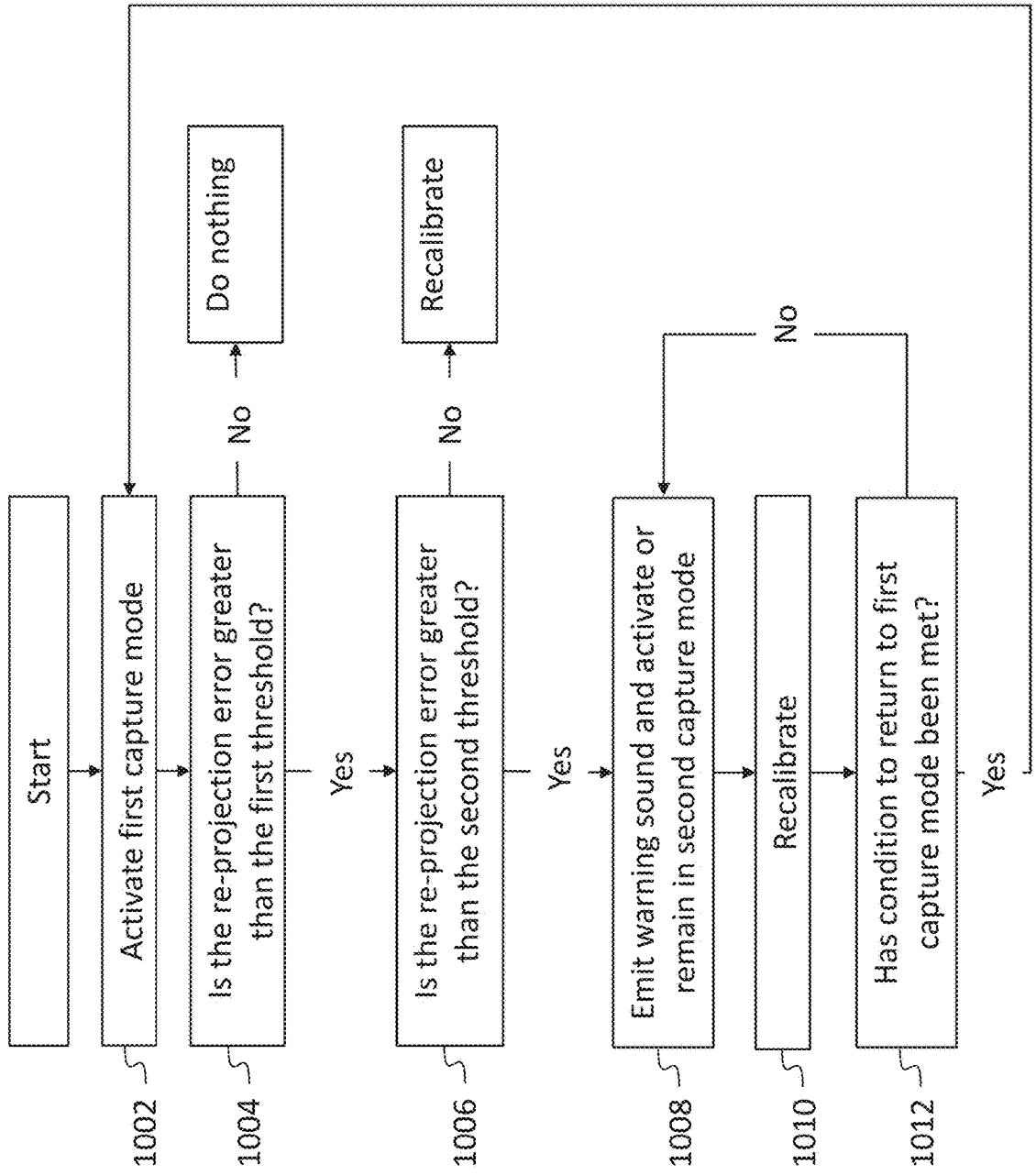
FIG. 10 is a flow chart of a method including a fine and a coarse recalibration system, according to an embodiment of the present disclosure.

With reference now to FIG. 10, in some embodiments, a plurality of threshold values may be used to trigger different capture modes to be used for recalibration while the vehicle 100 is in motion. For example, the vehicle 100 may start in a first capture mode 1002. In the first capture mode, the object detection system may review lidar data and camera images to detect salient features at a first rate (e.g., all of the objects in 1 frame per second). Based on the first capture mode object detection rate, if the re-projection error for the salient feature is less than a first threshold value then no recalibration occurs (e.g., 1004). If the re-projection error is greater than the first threshold value but less than a second threshold value then fine recalibration may occur (1006). However, if the re-projection error is greater than the second threshold value then a warning may be emitted (or given) to the user of the vehicle 100 and/or the vehicle 100 may change from the first capture mode to a second capture mode (e.g., 1008). In the second capture mode, the default rate of the object detection system may increase to a higher rate (e.g., all of the objects in 7 frames per second) to capture more salient features (assuming more salient features are available) in the lidar data and camera images. With the increased salient feature information, recalibration may be performed more urgently (e.g., in a shorter interval of time than in the first capture mode) and with increased accuracy (e.g., based on more salient features) (1010). In some embodiments, recalibration in the second mode is delayed for a short period of time while the vehicle 100 captures additional salient features to confirm the accuracy of the re-reprojection error before performing a coarse recalibration (i.e., calibration setting change resulting in a more than 100 pixel shift in alignment). In some embodiments, the second capture mode may remain active for a set period of time (e.g., 10 minutes) before the vehicle 100 returns to the first capture mode (e.g, 1012).

As an example, in some embodiments, the first capture mode may be active while the vehicle 100 is in motion along, for example, a flat road. The second capture mode may be triggered when the vehicle 100 encounters a condition (e.g., a speed bump) which may abruptly alter the sensor output. In this case, one or more salient features may be detected and re-projection error may be greater than the second threshold value (e.g., two or more salient features are off by more than 300-400 pixels). Therefore, the vehicle 100 may emit a warning sound, enter the second capture mode, and perform recalibration (e.g., a coarse recalibration) based on more data due to a higher salient feature detection rate from the second capture mode. Accordingly, vehicle operator and passenger safety may be enhanced due to recalibration settings tailored to the specific situation. Based on the fine and coarse recalibration system (e.g., a two-tier threshold system), sensor drift may also be accounted for while the vehicle 100 is in motion.

While FIG. 10 is described as having two threshold values and two capture modes, in some embodiments, the system and method of the present disclosure may have more than two threshold values and more than two captures modes as desired. For example, there may be three or more capture modes and three or more threshold values, each with different object detection rates.

The vehicle and/or any other relevant devices or components according to embodiments of the present disclosure described herein, such as, for example, a processing circuit and a control system, may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of ordinary skill in the art should recognize that the functionality of various computing/electronic devices may be combined or integrated into a single computing/electronic device, or the functionality of a particular computing/electronic device may be distributed across one or more other computing/electronic devices without departing from the spirit and scope of the present disclosure.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section, without departing from the spirit and scope of the inventive concept.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Further, the use of "may" when describing embodiments of the inventive concept refers to "one or more embodiments of the present disclosure." As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Although example embodiments of a system and method for calibration of a vehicle have been specifically described and illustrated herein, many modifications and variations will be apparent to those skilled in the art. Accordingly, it is to be understood that a system and method for calibrating a vehicle constructed according to principles of this disclosure may be embodied other than as specifically described herein. The disclosure is also defined in the following claims, and equivalents thereof.

What is claimed is:

1. A calibration system comprising:
    a processing circuit configured to:
        receive data corresponding to a first image from a first detector of a first detection system, the data comprising information corresponding to a two-dimensional bird's eye view (BEV) of a scene;
        receive data corresponding to a second image from a second detector of a second detection system, the data comprising information corresponding to a two-dimensional image of the scene from the second detector;
        determine a salient feature in the first image or the second image;
        project, based on a first calibration setting, the salient feature from the first image to the second image or from the second image to the first image;
        select a region corresponding to the projected salient feature in the first image or the second image;
        determine an identity of the salient feature;
        determine a second calibration setting based on the identity of the salient feature and the selected region corresponding to the salient feature in the two-dimensional BEV and the two-dimensional image;
        determine a re-projection error for the identified salient feature by utilizing intrinsic parameters and extrinsic parameters; and
        compare the determined re-projection error with a threshold to determine whether a re-calibration is needed.

2. The calibration system of claim 1, wherein the first detection system comprises a lidar system.

3. The calibration system of claim 1, wherein the second detection system comprises a camera imaging system.

4. The calibration system of claim 1, wherein the processing circuit is further configured to project, based on the determination of the salient feature in the first image or the second image, a bounding box region in the corresponding first image or the corresponding second image for suggesting placement of a second bounding box.

5. The calibration system of claim 1, wherein the processing circuit is configured to determine the second calibration setting while a vehicle is online and to apply the second calibration setting to the vehicle while the vehicle is online.

6. The calibration system of claim 1, wherein the second calibration setting is based on three or more salient features.

7. The calibration system of claim 1, wherein the processing circuit comprises an integrated circuit chip.

8. The calibration system of claim 1, wherein the processing circuit is configured to determine the salient feature in the first image or the second image according to an object detection system and to select the region corresponding to the projected salient feature in the first image or the second image according to the object detection system.

9. A calibration system comprising:
    a processing circuit configured to:
        receive data corresponding to a first image from a first detector of a first detection system, the data comprising information corresponding to a two-dimensional bird's eye view (BEV) of a scene;
        receive data corresponding to a second image from a second detector of a second detection system, the data comprising information corresponding to a two-dimensional image of the scene from the second detector;
        determine a salient feature in the first image or the second image;
        project, based on a first calibration setting, the salient feature from the first image to the second image or from the second image to the first image;
        select a region corresponding to the projected salient feature in the first image or the second image;
        determine an identity of the salient feature;
        determine a second calibration setting based on the identity of the salient feature and the selected region corresponding to the salient feature in the two-dimensional BEV and the two-dimensional image; and
        determine the salient feature in the first image or the second image according to an object detection system and to select the region corresponding to the projected salient feature in the first image or the second image according to the object detection system, wherein the object detection system is configured to detect objects at a first rate when a determined re-projection error is greater than a first threshold and to detect objects at a second rate when the determined re-projection error is greater than a second threshold.

10. A calibration method comprising:

receiving, by a processing circuit, data corresponding to a first image from a first detection system, the data comprising information corresponding to a two-dimensional bird's eye view (BEV) of a scene;

receiving, by the processing circuit, data corresponding to a second image from a second detection system, the data comprising information corresponding to a two-dimensional image of the scene;

determining, by the processing circuit, a salient feature in the first image or the second image;

projecting, by the processing circuit, based on a first calibration setting, the salient feature from the first image to the second image or from the second image to the first image;

selecting, by the processing circuit, a region corresponding to the projected salient feature in the first image or the second image;

determining, by the processing circuit, an identity of the salient feature;

determining, by the processing circuit, a second calibration setting based on the identity of the salient feature and the selected region corresponding to the salient feature in the two-dimensional BEV and the two-dimensional image;

determining, by the processing circuit, a re-projection error for the identified salient feature by utilizing intrinsic parameters and extrinsic parameters; and comparing, by the processing circuit, the determined re-projection error with a threshold to determine whether a re-calibration is needed.

11. The calibration method of claim 10, wherein the first detection system comprises a lidar system.

12. The calibration method of claim 10, wherein the second detection system comprises a camera imaging system.

13. The calibration method of claim 10, wherein the calibration method further comprises projecting, by the processing circuit, based on the determination of the salient feature in the first image or the second image, a bounding box region in the corresponding first image or the corresponding second image for suggesting placement of a second bounding box.

14. The calibration method of claim 10, wherein the calibration method further comprises determining, by the processing circuit, the second calibration setting while a vehicle is online and applying the second calibration setting to the vehicle while the vehicle is online.

15. The calibration method of claim 10, wherein the second calibration setting is based on three or more salient features.

16. The calibration method of claim 10, wherein the processing circuit comprises an integrated circuit chip.

17. The calibration method of claim 10, wherein the calibration method further comprises:

determining, by the processing circuit, the salient feature in the first image or the second image according to an object detection system; and selecting, by the processing circuit, the region corresponding to the projected salient feature in the first image or the second image according to the object detection system.

18. The calibration method of claim 17, wherein the calibration method further comprises:

detecting objects at a first rate, utilizing the object detection system, when the determined re-projection error is greater than a first threshold; and detecting objects at a second rate, utilizing the object detection system, when the determined re-projection error is greater than a second threshold.

* * * * *